Sept. 28, 1965　　　　　D. E. MELTON　　　　　3,208,264
CALIBRATABLE PRESSURE RESPONSIVE ACTUATOR
Filed March 12, 1963　　　　　　　　　　　　2 Sheets-Sheet 1

DARRELL E. MELTON,
*INVENTOR.*

BY

*ATTORNEYS*

Sept. 28, 1965     D. E. MELTON     3,208,264
CALIBRATABLE PRESSURE RESPONSIVE ACTUATOR
Filed March 12, 1963     2 Sheets-Sheet 2

DARRELL E. MELTON,
*INVENTOR.*

BY

ATTORNEYS

United States Patent Office 3,208,264
Patented Sept. 28, 1965

3,208,264
CALIBRATABLE PRESSURE RESPONSIVE
ACTUATOR
Darrell E. Melton, 1404 Somerville Road SE.,
Decatur, Ala.
Filed Mar. 12, 1963, Ser. No. 264,732
10 Claims. (Cl. 73—4)
(Granted under Title 35, U.S. Code (1952), sec. 266)

The invention described herein may be manufactured and used by or for the Government of the United States of America for governmental purposes without the payment of any royalties thereon or therefor.

This invention relates to a pressure responsive sensing device and more particularly to a pressure responsive sensing device of the diaphragm operated type that is adapted to be calibrated while operatively connected in a fluid flow system.

In many various instances it is highly desirable or even a necessity that a pressure responsive sensing device be included in a fluid flow system for indicating and/or controlling the pressure within the system. For example, where fuel or oxidizer gases or liquids such as liquid oxygen, hydrogen, or other like fuels are being supplied to the combustion chamber of a rocket engine, it is necessary that the pressure within the fluid flow system be accurately known and regulated since, as is well known in the aerospace field, a very slight change in the pressure of the system would adversely affect the flow rate of the propellant mixture and thus cause "rough running" or even an explosion to occur within the engine.

In order to assure the reliability and accuracy of any pressure responsive sensing device used in the fluid flow system of a launch or space vehicle, it is not only necessary that the sensing device be tested and calibrated prior to installation within the system but it is also imperative in many instances that the reliability and accuracy of the device be repetitively tested while it is coupled in the system. Such repetitive testing of the various elements, including any sensing devices making up the systems of a given unit, occurs during the so-called "countdown" just prior to the actual launching of the rocket or space vehicle and, in certain instances, during the flight of the vehicle.

In the past, pressure responsive sensing devices that have been used in launch or space vehicles have not only been expensive but have not been suited to many applications where the device must be highly reliable, compact, light, and relatively simple in construction and operation. In an effort to adopt these prior know pressure responsive sensing devices for use in many vehicle systems, various elaborate and expensive installations were tested and tried. Due to the complexity and consequent unreliability of these elaborate installations, it was determined in many cases that the space or launch vehicle would be more reliable if no sensing device were incorporated in certain fluid systems of the vehicle, although there would, of course, be some doubt about the actual condition of these systems since no pre-flight or flight check was made. The omission of sensing devices was especially prevalent in cases where the usefulness of the information derived from the device would depend directly on how accurately the device was calibrated just prior to actual launch of the vehicle.

The reasoning leading to the omission of these pressure responsive sensing devices that require calibrating is really apparent when it is realized that to check or calibrate a sensing device of the prior known type required either that the device be uncoupled from the fluid system line and then coupled to a system line from a calibration pressure source, or be changed from the system line to the calibration line through the use of hand, pressure or solenoid operated valves. Such calibration methods decreased the reliability of a sensing device installation due to: (1) the possibility of sensing line continuations; (2) the complexity, weight and size of the numerous components required; (3) the possibility of leakage occurring at the valve seats or connections of the components; and (4) the necessity that all components of the calibration system meet environmental requirements and function correctly at the proper time. Such problems increase in magnitude when it becomes necessary to employ several hundred such pressure sensing devices and remotely calibrate them on a launch vehicle or manned spacecraft located several hundred feet away on the ground or traveling through space. Under certain conditions, however, such as when the launch vehicle is fueled and an explosion may occur or when the launch or space vehicle utilizes nuclear propulsion stages, remote checkout becomes mandatory.

Reliable calibration and checkout techniques attain increased importance when it is realized that the complexity of present day vehicles necessitates the use of automatic computer checkout methods to expeditiously isolate any component problems on a space vehicle at the launch site or in space. The desirability of such a remotely performed checkout procedure plus the necessity of providing a simple and reliable pressure responsive sensing device capable of withstanding extreme temperature, vibration, and shock conditions readily indicated that some new and totally different approach to sensing pressure changes would be required.

According to the present invention, it has been found that a remotely calibrated pressure responsive sensing device which is reliable, simple and inexpensive can be produced by using a new and unique arrangement of elements, fluid flow systems and construction techniques. This novel remotely calibrated pressure responsive sensing device utilizes both a sensing and calibration actuator which are coupled together through a stem arrangement so that when a calibrational pressure source is applied to the calibration actuator, the force produced will be transmitted through the stem arrangement to the sensing actuator thus causing the sensing device to produce an output signal corresponding to a known pressure value. Any pressure source applied directly to the sensing actuator will, however, cause the calibration actuator and the stem arrangement attached thereto to be decoupled from the sensing actuator so that the output produced by the sensing device will be proportional only to the pressure applied to the sensing actuator.

Accordingly, the primary object of this invention is to provide a pressure responsive sensing device that can be remotely checked or calibrated.

Another object of this invention is to provide a remote calibration pressure responsive sensing device that requires a minimum of components, is highly reliable, light, compact, and inexpensive to produce.

These and further objects and advantages of this invention will become more apparent upon reference to the following description, claims, and appended drawing wherein:

In order to better understand the construction and use of this novel pressure responsive device it will be described in connection with a pressure sensitive transducer circuit. It is to be understood, however, that other signal producing devices of the pressure responsive type can be used or the pressure responsive device could be used to operate a hydraulic valve arrangement. Furthermore, other pressure actuators such as, for example, movable pistons can be used in place of or with diphragm actuators when such is desirable.

Figure 1:
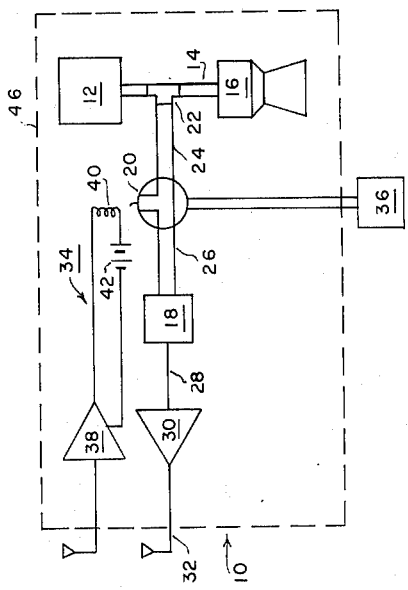
FIGURE 1 is a diagrammatic view showing the pertinent details of a conventional pressure responsive device together with the necessary systems required to remotely check or calibrate the device: the overall system being designed to monitor the pressure of a fuel mixture being fed into the combustion chamber of a rocket motor.

With continuing reference to the accompanying drawing wherein like reference numerals designate similar parts throughout the various views, and with initial attention directed to FIGURE 1, reference numeral 10 refers in general to a conventional pressure responsive system together with the necessary supporting apparatus required to remotely check or calibrate the operation of the system. A tank or reservoir 12 which may contain, for example, a liquid fuel under pressure is shown connected through a suitable line 14 to a rocket motor 16. In order to determine accurately the pressure of the liquid fuel as it passes through the line 14 and to the motor 16, a pressure responsive transducer 18 is connected to the line by means of pilot valve 20, a T joint 22, and lines 24–26. The electrical output signals produced by the transducer 18 during operation are connected through an electrical lead 28, to a telemetering system 30. The output signals from the telemetering system 30 are in turn applied to an antenna 32 or other suitable means for transmission to a remote receiving station.

A remotely operated pressure responsive system, generally designated as 34, and a suitable source of known calibrational pressure 36 are operatively connected to the valve 20 for providing means by which the pressure responsive transducer 18 can be remotely checked once it is installed. The switching system 34 includes a suitable remotely operated actuator 38 such as a receiver which has its output connected to one lead of a solenoid 40. The other electrical lead from the solenoid is connected through a suitable power source 42 to the actuator 38 so that the solenoid will be energized when the actuator receives a predetermined signal.

Energization of the solenoid 40 will cause the three-way pilot valve 20 to rotate 90° and connect the pressure responsive transducer 18 through the line 44 to the calibrational pressure source 36 so that if the transducer 18 is functioning properly a predetermined output signal will be produced. Any malfunction of the transducer 18 will, however, obviously prevent the predetermined output signal from being produced, thus giving a clear indication that the transducer is faulty and must be replaced.

Since all of the components contained within the broken line 46 are necessary for providing a remotely operated checkout system when a conventional pressure responsive switch it is used, it is clear that this prior known system is not only extremely complicated, expensive, and bulky, but its reliability leaves much to be desired. For example, if no predetermined signal from the transducer 18 is received when an actuating signal is transmitted to the actuator 38, there is always a question as to whether the indicated trouble is in the transducer 18 or the switching system 34. Furthermore, when the calibrational pressure source 36 is connected to the transducer 18 there is considerable danger that the switch input port and line will become contaminated and thereby contaminate the fuel to the rocket 16 when the valve 20 is again returned to its normal position.

Figure 2:
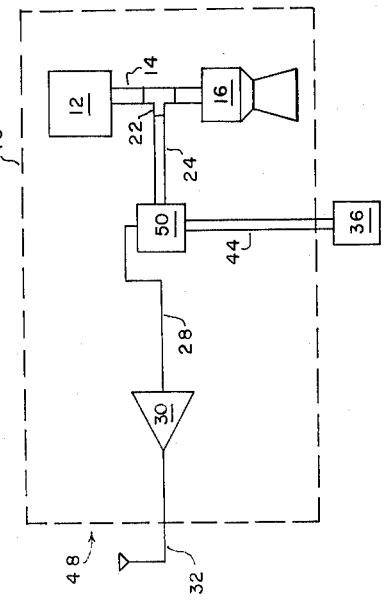
FIGURE 2 is a diagrammatic view showing the pertinent details of a remotely operated checkout or calibrational system utilizing a pressure responsive device constructed in accordance with the present invention.

FIGURE 2 illustrates a remotely operated checkout or calibrational system generally designated as 48, utilizing a pressure responsive transducer assembly 50 constructed in accordance with the present invention. As can be clearly seen, the present system 48 does not require a switch system such as shown at 34 in FIGURE 1 nor is a three-way pilot valve and its associated lines required. This reduction in parts results in a system that is lighter, less expensive to produce and, most importantly, more reliable in operation. The preferred construction and mode of operation of the pressure responsive transducer assembly 50 which makes the improved system possible can be more clearly seen in reference to FIGURES 3 through 5.

The pressure responsive transducer assembly 50 consists of a body or casing made up of an actuator housing 52, a first pressure chamber housing 54 and a second pressure chamber housing 56. The housings 52–56 are secured together in a fluid-tight manner by any suitable means such as studs 58 and nuts 60.

The actuator housing 52 is provided with a threaded aperture 62 for receiving a suitable pressure responsive transducer 64 such as, for example, a variable resistor 64. For purposes of illustration, the variable resistor 64 is shown to be of the carbon pile type. The output terminals 66 from the variable resistor 64 are located within the aperture 62 while the actuating arm or button for the resistor is shown at 68. A sensing diaphragm assembly 70 which is held in place by a flanged surface 72 located around the inner periphery of the housing 52 is positioned against the actuating button 68 of the transducer. Under certain circumstances it may be desirable to amount the transducer 64 outside the casing so that the transducer can readily be replaced if found faulty. This can easily be done, for example, by employing a transducer having an extended actuating button or by replacing the button with a push rod.

The first pressure chamber housing 54 is provided with an inlet port 74 which is adapted to be connected through the line 24 (FIGURE 2) to the system whose pressure is to be monitored. The upper inner periphery of the housing 54 is flanged out so as to form a lip 76 upon which the sensing diaphragm assembly 70 is seated. The lower inner periphery of the housing 54 is also flanged out to provide a lip 78 for receiving a calibration diaphragm assembly 80. As can be seen, a pressure chamber 82 is formed by the diaphragm assemblies 70, 80 in the inner walls of the housing 54 for receiving and retaining the fluid pressure applied through the inlet port 74.

Figure 3:
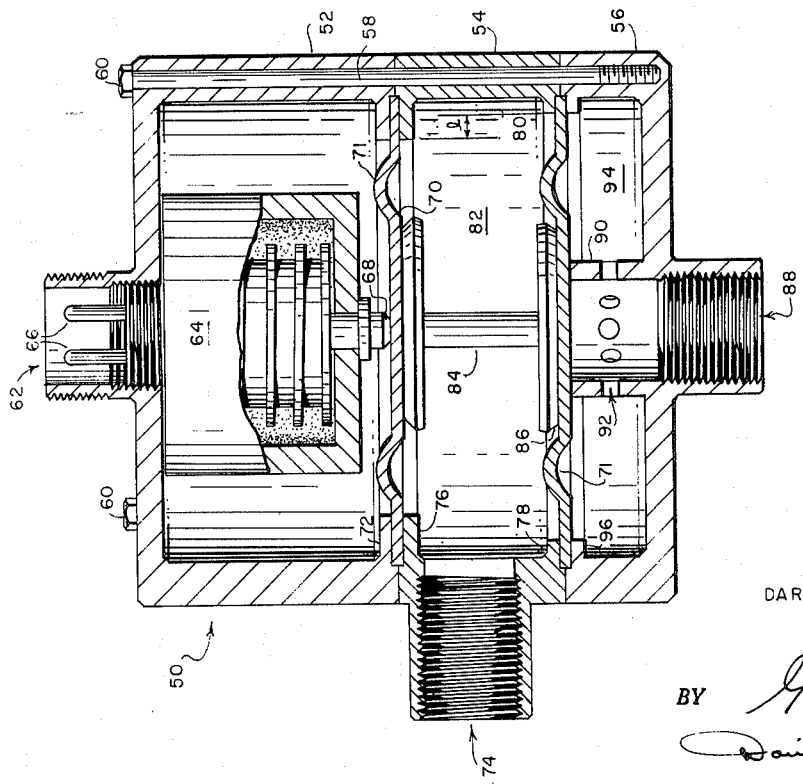
FIGURE 3 is a cross-sectional view of a preferred embodiment of a remotely calibrated pressure responsive device constructed according to the present invention.
Figure 4:
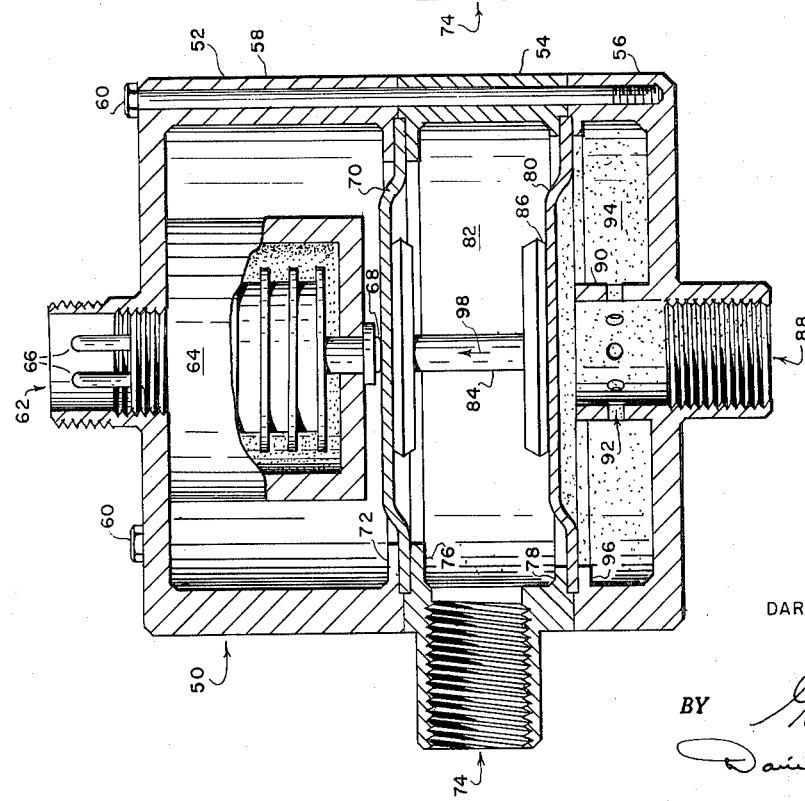
FIGURE 4 is a cross-sectional view of the pressure responsive device of the present invention with a calibration pressure source applied thereto; and, FIGURE 5 is a cross-sectional view of the pressure responsive device of the present invention with a sensing pressure source applied thereto.

The diaphragms 70 and 80 can be formed of any suitable material that is resilient in nature as long as it will support the pressures to be encountered and will not deteriorate when exposed to the fluid flowing through the system being monitored. Preferably, however, the diaphragms are constructed of steel since it has been found that this material will retain its original shape and perform better under the conditions encountered in rocket and space vehicle applications. To prevent undue stress from occurring within the diaphragms when they are subjected to an operating force, a ridged or looped portion 71 as seen in FIGURE 3 is formed near the outer edge of the diaphragms 70 and 80. As seen in FIGURE 4, the ridged portions 71 prevent the diaphragms 70 and 80 from being exposed to stretching beyond their original form, thus assuring that the diaphragms will return to their original shape once the line pressure from the actuating source is removed.

A spool shaped piston member 84 is positioned between and in contact with the center position of the diaphragm assemblies 70 and 80 so that any upward movement of the calibration diaphragm assembly 80 will be transmitted through the piston member to the sensing diaphragm assembly 70. The piston member 84 is shown welded or otherwise secured at 86 to the calibration diaphragm assembly 80 for both preventing lateral movement of the member and for preventing damping of the sensing diaphragm assembly 70 from occurring when pressure is being applied only at the inlet port 74.

The second pressure chamber housing 56 is provided with an inlet port 88 which is adapted to be connected to a calibrational pressure source such as shown at 36 in FIGURE 2. The inlet port 88 extends into the interior of the housing 56 to form a tubular seat or stop surface 90 against which the middle surface of the calibration diaphragm assembly 80 rests when it is driven in a downward direction. Apertures 92 are formed through the tubular stop 90 for permitting the fluids passing through inlet port 88 to enter the pressure chamber 94 formed by the inner walls of the housing 56 and the diaphragm assembly 80. To secure the edges of the diaphragm assembly 80 against downward movement and to form a perfect seal joint, the upper inner periphery of the housing 56 is flanged out to form a lip 96.

Figure 5:
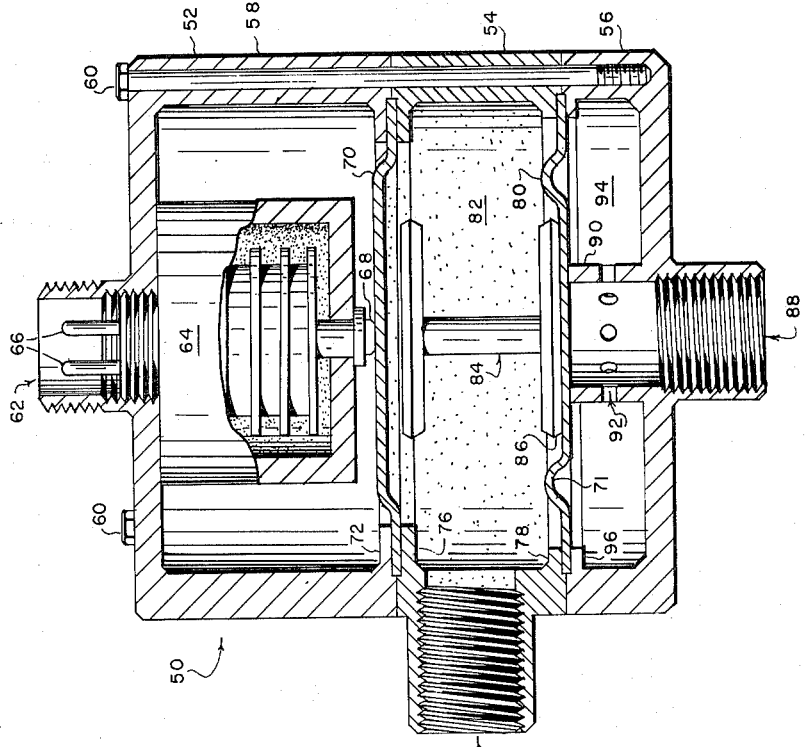

The operation of the pressure responsive transducer assembly 50 can better be understood by referring to FIGURES 4 and 5. In FIGURE 4 a calibration pressure source, such as shown at 36 in FIGURE 2, is applied through the calibration inlet port 88 and is pictorially represented by the dots located within the pressure chamber 94. This pressure within the chamber 94 acts upon the calibration diaphragm assembly 80 to move the assembly in an upward direction as represented by the arrow 98. Since the piston member 84 is resting upon and is secured to the diaphragm assembly 80, it will be lifted as the assembly moves up, thereby also moving the sensing diaphragm assembly 70. This movement of sensing diaphragm assembly 70 will in turn move the actuating button 68 and compress the carbon pile resistor 64, thereby varying its resistance so that the output resistance appearing at terminals 66 will be of a predetermined value if the resistor element is operating properly. Once the checkout or calibration of the resistor 64 is complete and the calibrating pressure source is removed from the chamber 94, the diaphragm assemblies will return to their original position as shown in FIGURE 3.

With the pressure responsive transducer assembly 50 now checked out or calibrated and known to be in proper operating condition, it can be relied upon to detect any source of pressure applied through the sensing part 74 that is greater than a predetermined value. FIGURE 5 illustrates the function of the transducer assembly 50 when it is connected to a system line to be monitored such as the line 14 in FIGURE 2. With a pressure of a predetermined value applied through the sensing port 74, as represented by the dots in the pressure chamber 82, the sensing diaphragm assembly 70 will be moved upward thereby moving the actuating button 68 of the variable resistor 64. This in turn produces a change in the output resistance as read across the terminals 66 thus giving an indication of the pressure existing within the chamber 82.

As can be seen in FIGURE 5, the pressure within the chamber 82 will not only act to move the sensing diaphragm assembly 70 upward but will also move the calibrating diaphragm assembly 80 down into tight engagement against the top surface of the stop 90. Since the piston member 84 is welded to the calibrating diaphragm assembly 80 and the mass thereof is supported solely by this assembly, the mass-spring system of the calibration diaphragm and piston member is not added to that of assembly 70 when normal readout operation of the transducer assembly is desired. Therefore, the variation characteristics of the variable resistor 64 is unaffected by the additional diaphragm assembly 80.

Although the spring rate of the sensing diaphragm assembly 70, the mass of the piston member 84, and the spring rate of the calibration diaphragm assembly 80 are added together during the checking or calibration of the pressure responsive transducer assembly 50, these combined forces can be compensated for by simply making the effective area of the calibration diaphragm assembly slightly greater than the area of the sensing diaphragm assembly for pressure compensation. This enlarging of the effective force area of the calibration diaphragm assembly 80 can be accomplished, for example, by reducing the length of the lips 78 and 96 that holds the assembly by an amount in reference to the lip 76 as shown in FIGURE 3. This effectively increases the area of the calibration diaphragm assembly 80 so that the assembly will indicate the same pressure readout or setting (the pressure at which the resistance of the variable resistor 64 will be of a known or preselected value) as will be indicated when a system line is used for pressurization. If any further enlargement in the area of the calibration diaphragm assembly 80 needs to be made to give an accurate reading it is only necessary that the edge of the lips 78 and 96 be further milled down until the desired area is attained.

If such is desired, it is possible to support the force transmitting piston member 84 by means of a sleeve arrangement mounted to the housing 54 rather than securing the member to the diaphragm 80. This, of course, would result in diaphragm 80 being freed from the weight of the piston member 84. However, in some cases, it may be undesirable to allow the piston member 84 freedom to move axially when the diaphragm 80 does not move.

It should be noted that the pressure responsive transducer assembly 50 can be accurately calibrated even though a residual system pressure might be in the sensing port cavity 74. In such a case, the calibration pressure and system pressure would counterbalance each other since they act on opposite sides of the calibration diaphragm assembly 80 and the pressure measured by the calibration system 50 would be the actual pressure applied on the calibration diaphragm assembly 80 through inlet port 88. Conversely, after calibration when the transducer assembly 50 is required to function due to a system pressure being applied through sensing port 74, the setting or operating pressure points of the variable resistor will not be affected by any residual pressure that may still remain in the pressure chamber 94 if the residual pressure is not greater than the system actuating pressure. This feature is due again to the fact that the residual calibration pressure will be counterbalanced by the system pressure applied to the chamber 82 since the two pressures are merely acting on opposite sides of the calibration diaphragm assembly 80.

From the foregoing it is readily apparent that any pressure responsive device employing a diaphragm assembly as a sensor could utilize the calibration diaphragm assembly and piston member of this invention as a self-contained mechanism for remote calibration purposes. For example, the pressure responsive resistor 64 could be replaced by a pressure operated switch, valve assembly or other like unit simply by unthreading the transducer from the aperture 62 and replacing it with some other unit. This versatility and simplicity of the pressure responsive sensing device of this invention, plus its reliability, light weight and inexpensive construction make it particularly appealing for use on launch and space vehicles where it is desirable to obtain a plurality of pressure readings yet neither interfere with the system sensing lines nor include a complex calibration system in each line as flight components on the vehicle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and desired to be secured by the United States Letters Patent is:

1. In a pressure system, a pressure responsive sensing apparatus comprising:
   (a) body means having a chamber with a movable wall portion,
      (1) said wall portion having associated therewith a transducer responsive to pressure exerted on said movable wall portion;
   (b) a movable partition wall arranged to divide said chamber into a near subchamber partially bounded by said movable wall portion and a far subchamber separated from said movable wall by said near subchamber;
   (c) force transmitting means mounted on said movable partition wall and extending into engagement with said movable wall;
   (d) means connecting said bar subchamber to a calibrated pressure source for calibrating the output of said transducer by the force exerted on said movable partition wall and transmitted through said force transmitting means to said movable wall portion;
   (e) and means connecting said near subchamber to said fluid pressure system whereby variations in the pressure of said system will vary the pressure exerted on said movable wall portion,
      (1) said movable partition wall and said force transmitting means mounted thereon being urged in a direction away from said movable wall by the pressure within said near subchamber whereby said force transmitting means is disengaged from said movable wall.

2. In a fluid pressure system according to claim 1 wherein the effective area of said movable partition wall is greater than the effective area of said movable wall by an amount necessary to compensate for the mass of said force transmitting means mounted thereon.

3. A pressure responsive sensing device, comprising:
   (a) pressure responsive means;
   (b) pressure actuated assembly means associated with said pressure responsive means,
      (1) said assembly means comprising first and second pressure movable means mounted with a housing means,
         (a) said first and second movable means being spaced apart and associated with said housing means to form a first and second pressure chamber;
   (c) means for connecting said first movable means to said transducer means;
   (d) means for applying a first pressure source to said first pressure movable means so that said first pressure movable means is moved in a first direction thereby actuating said pressure responsive means;
   (e) means for applying a second pressure source to said second pressure movable means so that said second pressure movable means is moved in said first direction;
   (f) and coupling means operatively connected between said first and second pressure movable means for transmitting the movement of said second pressure movable means in said first direction to said first pressure movable means whereby said pressure responsive means is actuated,
      (1) said coupling means being ineffective to transmit the movement of said second pressure movable means in said second direction to said first pressure movable means.

4. A pressure responsive sensing device comprising:
   (a) housing means;
   (b) pressure responsive transducer means associated with said housing means;
   (c) pressure actuated assembly means associated with said transducer means,
      (1) said assembly means comprising first and second pressure movable means,
         (a) said first and second movable means being spaced apart and associated with said housing means to form a first and second pressure chamber;
   (d) means for transmitting the movement of said first pressure movable means to said transducer means;
   (e) means for applying a first pressure source to said first chamber so that said first movable means is moved in a first direction thereby actuating said transducer means while said second movable means is moved in a second direction;
   (f) means for applying a second pressure source to said second pressure chamber so that said second movable means is moved in said first direction;
   (g) and coupling means operatively connected between said first and second movable means for transmitting the movement of said second movable means in said first direction to said first movable means whereby said transducer means is actuated,
      (1) said coupling means being ineffective to transmit the movement of said second movable means in said second direction to said first movable means.

5. A pressure responsive sensing device according to claim 4 wherein said coupling means is carried by said second movable means so that said first movable means is free of any damping effect associated with said coupling means.

6. A pressure responsive sensing device according to claim 4 wherein the effective area of said second movable means exposed to said second pressure chamber is greater than the effective area of said first movable means exposed to said first pressure chamber by the amount necessary to compensate for the spring rate of said first movable means.

7. A pressure responsive sensing device according to claim 4 wherein a stop means is mounted within said second pressure chamber for limiting the movement of said second movable means in said second direction.

8. A pressure responsive sensing device comprising:
   (a) a housing;
   (b) a pressure responsive transducer mounted within said housing;
   (c) a pressure responsive assembly associated with said transducer,
      (1) said assembly comprising a sensing diaphragm and a calibration diaphragm,
         (a) said sensing and calibration diaphragms being spaced apart and secured to said housing to form a first pressure chamber,
         (b) said housing and said calibration diaphragm cooperating to form a second pressure chamber;
   (d) means for applying pressure to said first pressure chamber for moving said sensing diaphragm in a first direction and said calibration diaphragm in a second direction,
      (1) said transducer being actuated when said sensing diaphragm is moved in said first direction;
   (e) means for applying pressure to said second pressure chamber for moving said calibration diaphragm in said first direction;
   (f) and coupling means positioned between said diaphragm,
      (1) said coupling means engaging said diaphragms so that any movement of said calibration diaphragm in said first direction when said second chamber is pressurized will be transmitted through said sensing diaphragm to said transducer, (2) said coupling means being disengaged from at least one of said diaphragms when said first chamber is pressurized so that said diaphragms are independently movable.

9. A pressure responsive sensing device according to claim 8 wherein said coupling means is mounted on said calibration diaphragm.

10. A pressure responsive sensing device according to claim 9 wherein said pressure responsive transducer is a variable resistor.

References Cited by the Examiner

UNITED STATES PATENTS 2,067,614   12/62   Rich _____ 73—4 X

LOUIS R. PRINCE, *Primary Examiner.*